US 6,685,425 B2

(12) United States Patent
Poccia et al.

(10) Patent No.: US 6,685,425 B2
(45) Date of Patent: Feb. 3, 2004

(54) INLET BLEED HEATER FOR HEATING INLET AIR TO A COMPRESSOR AND METHODS OF FABRICATING AND TRANSPORTING THE HEATER

(75) Inventors: Nicholas Philip Poccia, Gansevoort, NY (US); Laurence Ambrose Kenny, III, Rindge, NH (US); Karl Kurt Rocco Westphal, Clifton Park, NY (US); Diwakar Balasubramanyam, Niskayuna, NY (US); William George Carberg, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/179,243

(22) Filed: Jun. 26, 2002

(65) Prior Publication Data

US 2004/0001751 A1 Jan. 1, 2004

(51) Int. Cl.⁷ .............................................. F04D 31/00
(52) U.S. Cl. .................. 415/116; 415/134; 415/145
(58) Field of Search .................. 415/116, 134, 415/135, 136, 144, 145, 58.4, 58.5, 58.7

(56) References Cited

U.S. PATENT DOCUMENTS

| 5,088,775 | A | | 2/1992 | Corsmeier et al. ........... 285/374 |
| 5,560,195 | A | * | 10/1996 | Anderson et al. ............. 60/785 |
| 6,027,304 | A | | 2/2000 | Arar et al. .................... 415/116 |
| 6,065,756 | A | | 5/2000 | Eignor et al. ................ 277/545 |

* cited by examiner

Primary Examiner—Edward K. Look
Assistant Examiner—Dwayne J. White
(74) Attorney, Agent, or Firm—Nixon & Vanderhye

(57) ABSTRACT

An inlet bleed heater for flowing heated air to the inlet of a compressor is fabricated wholly at a factory site. The heater interconnects a manifold which receives extraction air from the compressor to down tubes in the inlet air duct to supply heated extraction air to the ambient inlet air via piping with bellows. The bellows accommodate thermal expansion and contraction of the manifold and the down tubes. The pipe and bellows lie within the height envelope of the bleed heater, facilitating transportation of the heater on its side within overall height and width limitations permitted for road travel.

15 Claims, 8 Drawing Sheets

INLET BLEED HEATER FOR HEATING INLET AIR TO A COMPRESSOR AND METHODS OF FABRICATING AND TRANSPORTING THE HEATER

BACKGROUND OF THE INVENTION

The present invention relates to an inlet bleed heat system for heating air supplied to a compressor inlet and particularly relates to such system and to methods of fabricating the system at a fabrication site and transporting the system to an electricity generating site.

Inlet bleed heat systems for elevating the temperature of ambient air drawn into the compressor are known. For example, as disclosed in U.S. Pat. No. 6,027,304, issued Feb. 22, 2000, of common assignee herewith, the disclosure of which is incorporated by reference, an inlet bleed heater is disposed in an air duct for supplying heated ambient air to the compressor inlet. The system as disclosed in that patent includes a housing defining a duct in communication at one side with an air filter and noise suppressor and at its opposite side with the compressor inlet. The duct houses a plurality of tubes supplied with heated air, preferably extraction air from the compressor, for elevating the ambient air flowing through the duct to a predetermined temperature. In the system disclosed in that patent, pipe loops in a sinuous configuration interconnect a common manifold which receives the extraction air from the compressor and the tubes disposed in the air inlet duct. The pipe loops extend away from the manifold, are reversely bent to extend over the manifold and then turn substantially 90° for connection with the tubes or donwpipes within the air inlet duct. The pipe loops accommodate thermal expansion of the various parts of the inlet bleed heat system.

While the inlet bleed heat system as disclosed in that patent has been in commerce for some time, certain problems have arisen in connection with its transport and assembly at a field site, e.g., an electricity-generation site. Generally, the inlet duct housing, manifold and downpipes or tubes are fabricated at a fabrication site and transported to the power-generation site, where the pipe loops are secured, e.g., by welding, to the manifold and tubes. It will be appreciated that the factory-fabricated portion of the system has large physical dimensions. The height of the unit when loaded on a trailer approximates the clearance available for transport of the unit under bridges. As a consequence, and notwithstanding careful attention to transportation routes, bridges have been struck by the unit due to driver error, inaccurate measurements of the height of the unit on the trailer and inaccurate bridge heights. Further, the pipe loops are assembled to the unit in the field at the power-generation site because they otherwise would extend the height of the unit above the acceptable height dimension. The field assembly of pipe loops require field welding of the pipe loops of the manifold and downpipes or tubes which, in turn requires X-ray inspection of the welds before the unit can be placed into operation. Field assembly time and maintenance of quality during field assembly have increased costs. As a consequence, there has developed a need for an improved inlet bleed heater system, as well as methods of fabricating and transporting the system.

BRIEF DESCRIPTION OF THE INVENTION

In accordance with a preferred embodiment of the present invention, there is provided an inlet bleed heat system which can be wholly fabricated at a fabrication site and transported to a power-generation site without exceeding and lying well within height and width transportation limitations. To accomplish the foregoing, the inlet bleed heater system comprises a housing defining an inlet air duct for the compressor, a manifold, a plurality of tubes extending into the air duct and a plurality of devices for accommodating thermally induced relative movement between the manifold and downpipes or tubes when in use and which housing will lie within the defined height and width dimensions. Preferably, the manifold and tubes are coupled to one another through bellows arrangements which accommodate such thermally induced relative movement. Thus, a pipe, preferably having a double-bellows arrangement, is interposed between the manifold and each tube in the air inlet duct. It will be appreciated that the bellows accommodates the thermal axial expansion and contraction of the manifold, as well as movement of the tubes relative to the manifold. The pipes with the double bellows arrangement afford direct connections with the donwpipes and eliminate the loops disclosed in U.S. Pat. No. 6,027,304 overlying the manifold.

Additionally, by utilizing a bellows arrangement and fabricating the entirety of the unit at a fabrication site, the conventional field assembly of pipe loops is entirely eliminated. Also, because factory fabrication utilizing the bellows arrangement reduces stresses in the unit, field X-ray inspection of the weld joints at the fabrication site is eliminated, reducing cost and manufacturing time. Further, because the bellows arrangement reduces the overall height of the system, the factory-fabricated unit can be disposed on its side on a flatbed trailer within a predetermined transportation width limitation and transported from the fabrication site to the power-generation site, with greatly increased clearance between the unit on the trailer and any bridges along the route. The reduced envelope of the factory-fabricated unit, moreover, does not require special permits for all loads and generally does not restrict the routes between the fabrication site and power-generation site. That is, by eliminating pipe loops while maintaining their functionality, the unit can be placed on its side on a trailer for transportation having height and width dimensions well within standard height and width limitations for travel over most highways and rods.

In a preferred embodiment according to the present invention, there is provided in inlet bleed heater for a compressor, comprising a housing defining an air inlet duct for delivering ambient air along a flowpath to the compressor, a plurality of tubes in the flowpath of the air inlet duct, the tubes adapted for receiving heated extraction air from the compressor, each tube including a plurality of apertures spaced from one another for discharging the heated air from the tubes into the flowpath for mixing with the ambient inlet air passing the tubes to supply heated air to the compressor, a manifold carried by the housing for supplying the extraction air from the compressor to the tubes, the manifold and each of the tubes being connected to one another by a bellows enabling relative movement between the manifold and the tubes in response to thermally induced forces.

In a further preferred embodiment according to the present invention, there is provided a method of providing an electricity generation site with an inlet bleed heater for heating ambient inlet air to a compressor, the heater including a housing defining an air inlet duct, a plurality of tubes extending into the duct, and a manifold for receiving heated air from a heated air source, comprising the steps of fabricating the duct, tubes and manifold at a fabrication site, interconnecting the tubes and manifold one to the other at the fabrication site with a device for accommodating thermally induced movement of the manifold relative to the tubes and transporting the fabricated inlet heater to the electricity-generating site.

DETAILED DESCRIPTION OF THE INVENTION

Figure 1:
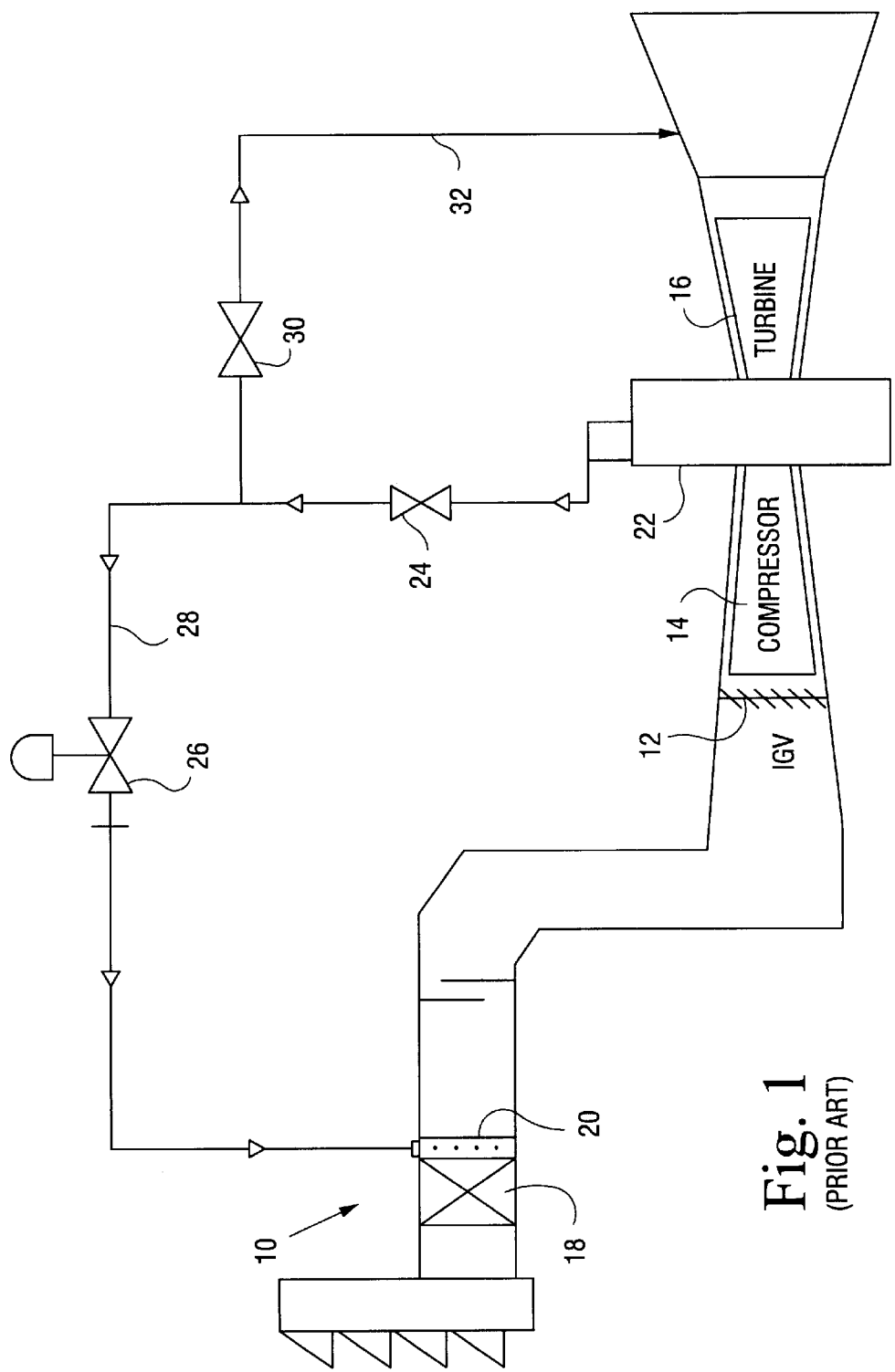
FIG. 1 is schematic representation of a prior art high pressure inlet bleed heat system for supplying heated air to a compressor inlet.

Referring now to the drawings, particularly to FIG. 1, there is illustrated an inlet duct, generally designated 10, for receiving ambient air and directing the air to the inlet guide vanes 12 for the compressor 14 of a turbine 16. Silencing baffles 18 are disposed in the inlet duct 10 directly upstream of heater tubes or downpipes 20. The heater tubes 20 are provided with heated compressed air extracted from a compressor discharge manifold 22 via a line 28. A manual isolation valve 24 and a control valve 26 are provided in line 28. A drain valve 30 may be employed in line 28.

Figure 2:
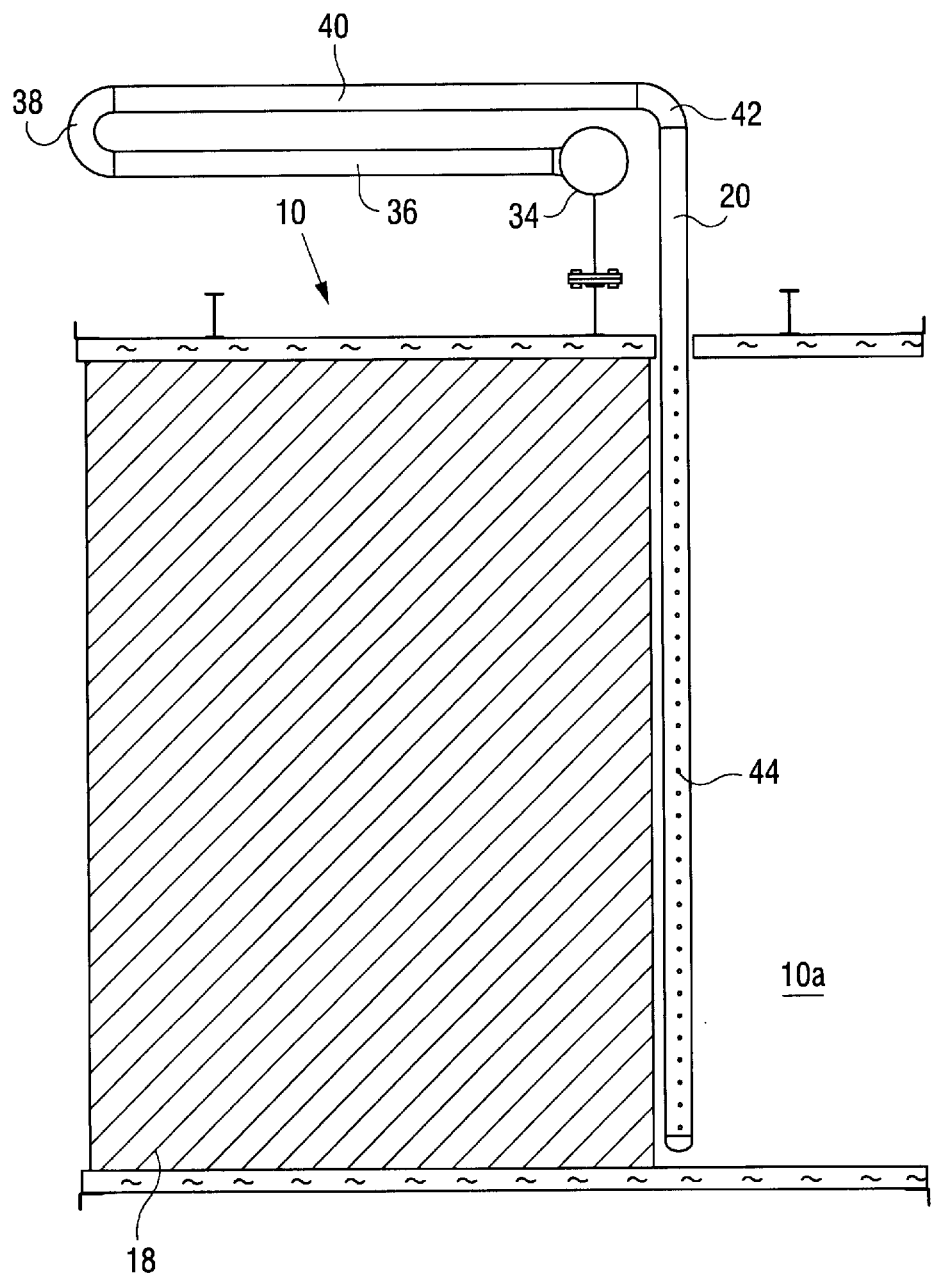
FIG. 2 is an enlarged fragmentary schematic illustration of the compressor air inlet duct of FIG. 1 illustrating one tube of a multi-tube heating system downstream of a silencer baffle.

Referring now to FIG. 2, the inlet duct 10 is preferably a generally rectilinear cross-section. Silencing baffles 18 comprise a plurality of baffles, preferably standing on-end in a vertical direction and in spaced side-by-side relation to one another. Ambient inlet air passes between the baffles for flow past the heater tubes 20 downstream to the compressor 14. The heated compressed air is provided via line 28 to an inlet bleed heat manifold 34. Manifold 34 comprises an elongated cylindrical header which extends transversely and externally relative to the inlet duct 10. The heater tubes or downpipes 20 are connected at spaced intervals along the forward side of header 34. The manifold 34 and heater tubes 20 are connected by pipe loops comprising forwardly extending, generally horizontal portions 36, reverse bend portions 38, and rearwardly extending portions 40 and a downward 90° elbow or bend 42 whereupon the heater tubes 20 extend vertically downwardly and into the inlet duct 10. Note that the reverse bend 38 and rearwardly extending portion 40 extend upwardly and over the manifold 34, increasing the height of the inlet bleed heater. The tubes 20 are uniformly spaced transversely relative to one another and are disposed in the inlet duct 10 downstream of the downstream edges of the silencer baffles 18. The outside diameter of the tubes 20 is preferably less than the thicknesses of the silencer baffles upstream of the tubes 20.

Figure 3:
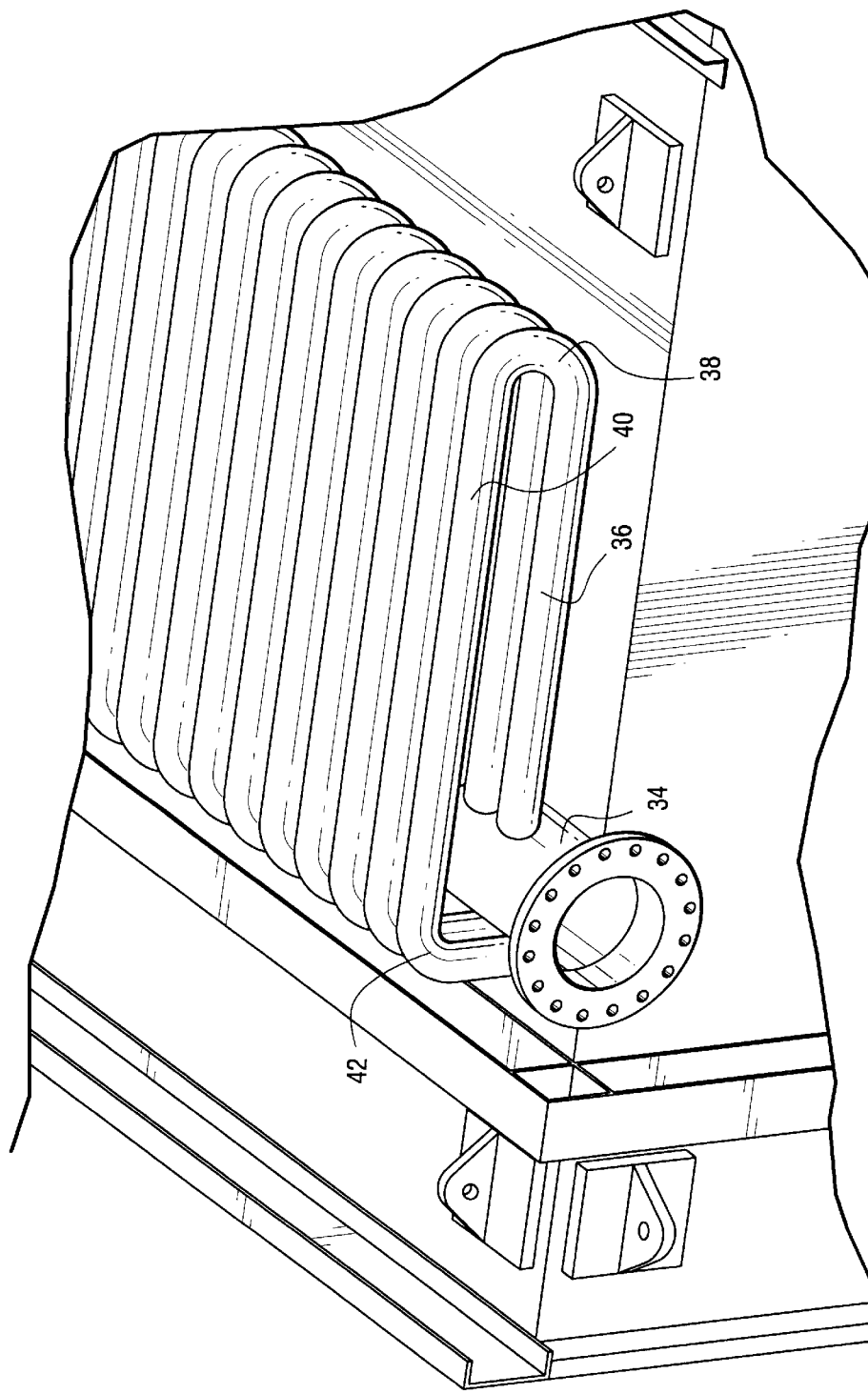
FIG. 3 is a fragmentary perspective view of the prior art high pressure inlet bleed heat system illustrating the manifold and pipe loops at the top of the system.
Figure 7:
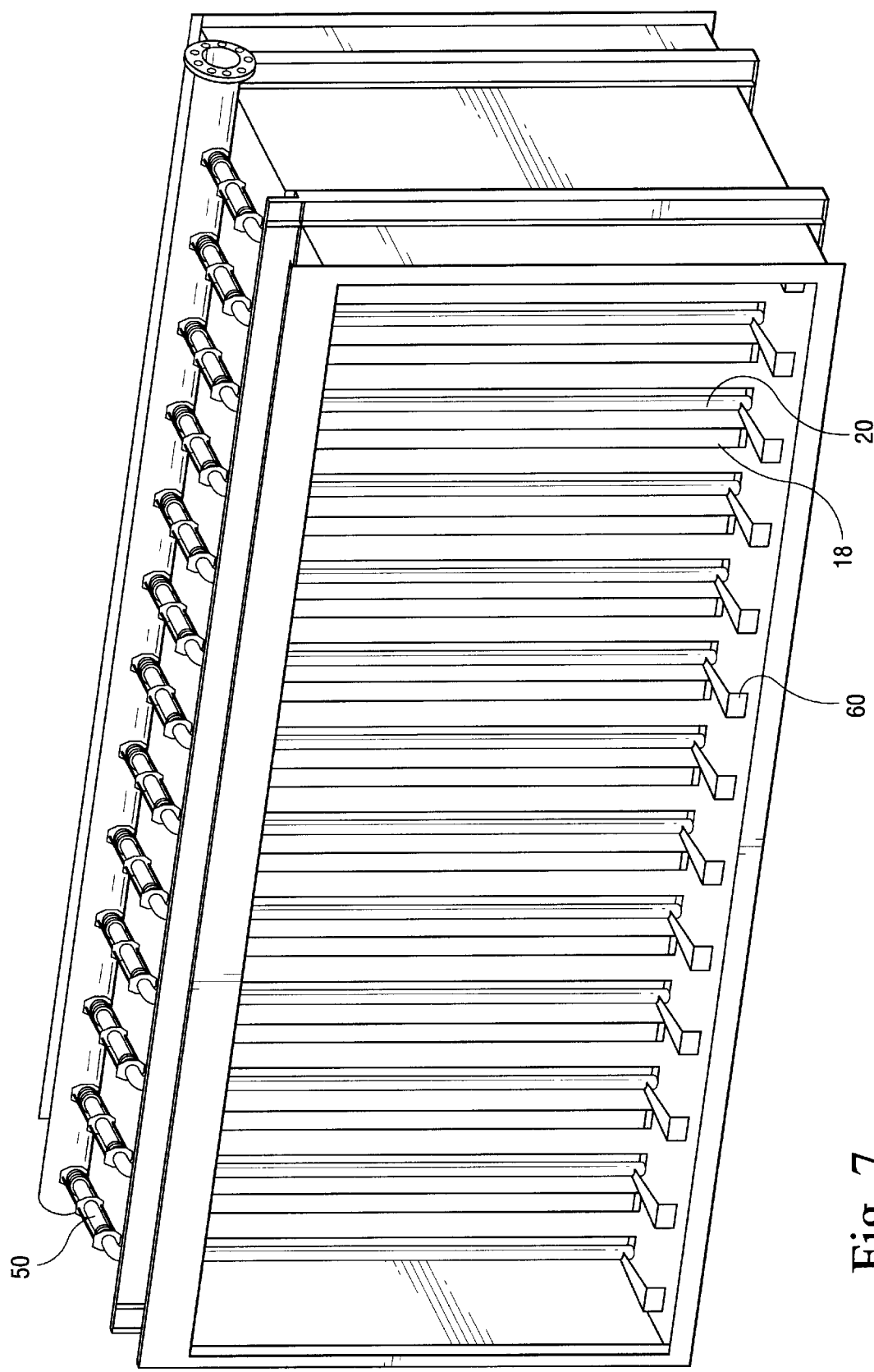
FIG. 7 is a perspective view of a further embodiment of the present invention illustrating downpipes behind every other silencer panel.

In the present invention, as well as in the prior art illustrated in FIGS. 1–3, each of the tubes 20 within the inlet duct has a plurality of laterally opening apertures 44. The apertures are sized to provide choked flow of heated compressed air into the inlet duct 10. The apertures open through opposite lateral sides of each tube and are laterally aligned and in registration with the apertures of next-adjacent tubes. By locating the tubes directly downstream of the silencer baffles 18 and in a position to jet heated compressed air laterally toward one another, improved mixing of the heated air and the inlet air to the duct without substantial pressure loss is achieved, for reasons noted in U.S. Pat. No. 6,027,304. It has also been found that downpipes 34 can be located behind every other baffle 18 as illustrated in FIG. 7.

It will be appreciated that the pipe loops interconnecting the manifold 34 and the tubes 20 lie above the inlet bleed heater and extend the height of the inlet bleed heater sufficiently to cause transportation problems, particularly, when loaded on a flatbed, with the height dimension exceeding the height limitation on many highways and road systems. For this reason, the pipes loops are typically fabricated at the electrical power generation site rather than at a fabrication or factory site. As noted previously, however, field assembly of the pipe loops requires additional time, incurs additional costs, requires field X-ray weld equipment and generally reduces the control on installation of the pipe loops. Also, because of driver error, inaccurate bridge measurements and inaccurate bridge heights reported by highway departments, a number of inlet bleed heaters, even without the pipe loops at the top, have hit bridges, resulting in costly delays in the installation and/or repairs of the heaters.

Figure 4:
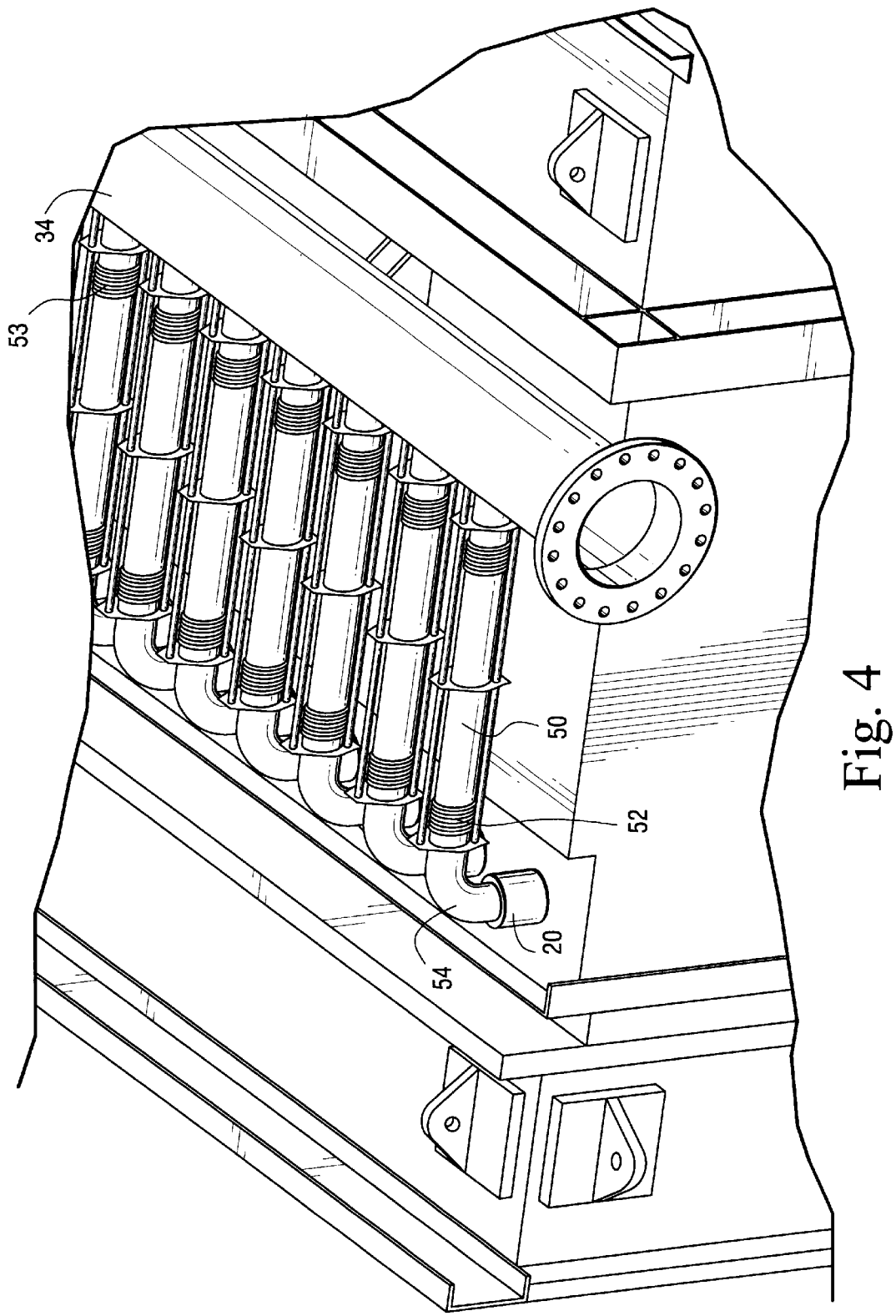
FIG. 4 is a view similar to FIG. 3 illustrating the top portion of an inlet bleed heater constructed in accordance with a preferred embodiment of the present invention.
Figure 5:
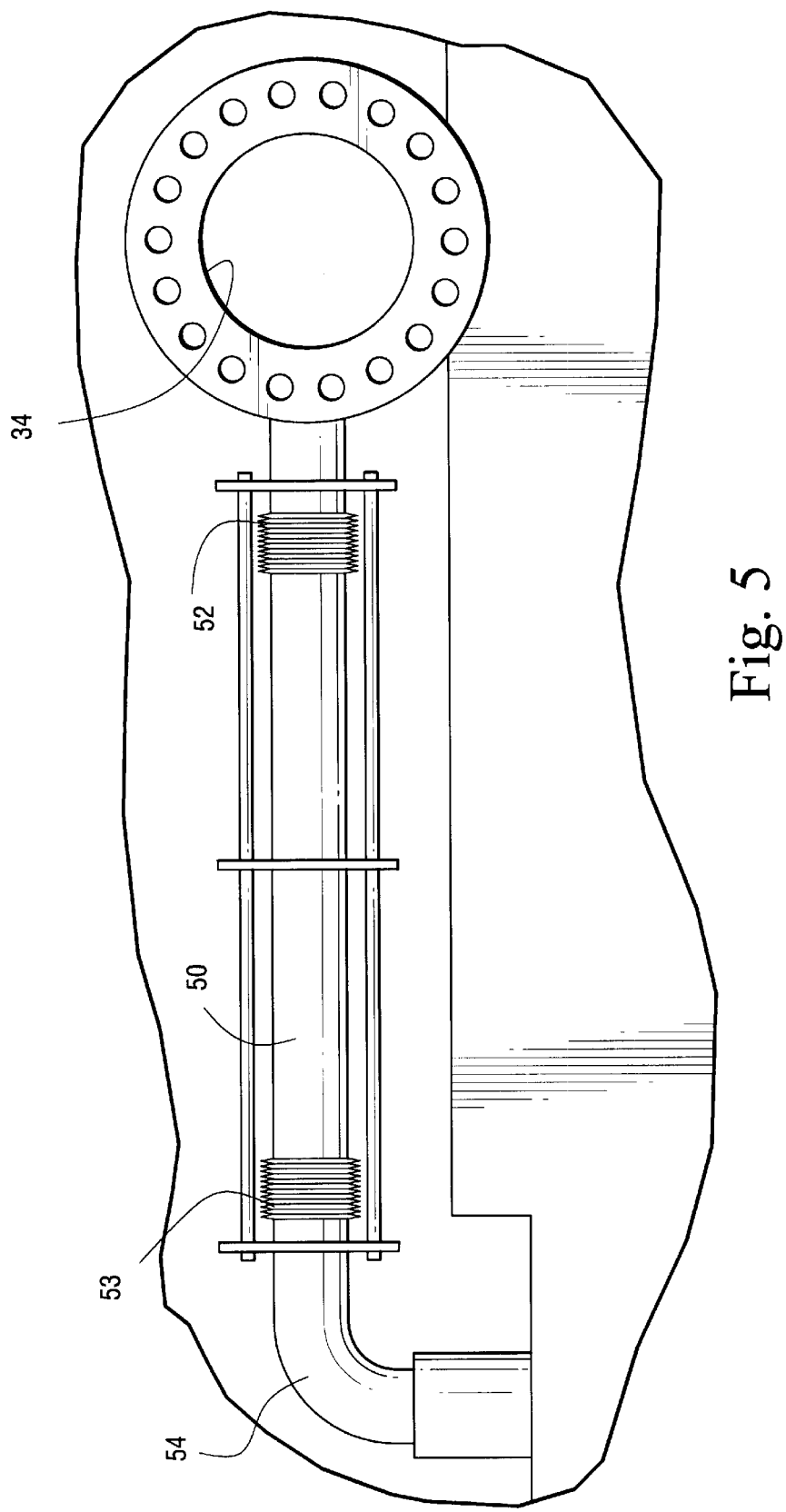
FIG. 5 is a fragmentary side elevational view thereof.
Figure 6:
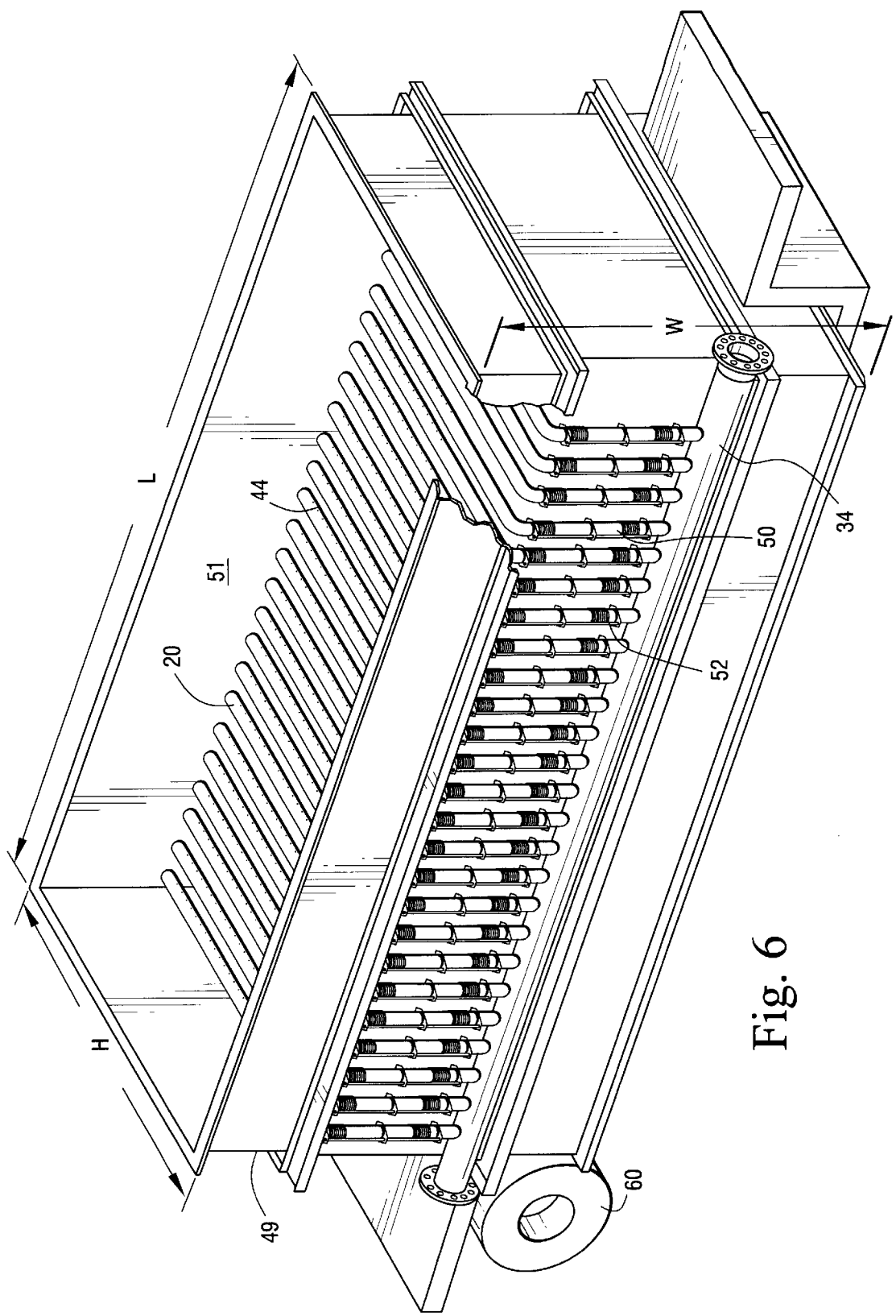
FIG. 6 is a perspective view with portions broken out for clarity of an inlet bleed heater according to a preferred embodiment of the present invention loaded on a flatbed trailer for transportation to an electricity generation site.

In accordance with a preferred form of the present invention as illustrated in FIGS. 4–6, the manifold 34 and the downpipes 20 are interconnected by piping 50 containing one or more devices 52 which accommodate thermally induced movement of the manifold relative to the tubes and reduce the overall height of the housing 40 defining the air duct 51 through the housing. Devices 52 preferably constitute one or more bellows 53 interconnecting between a manifold 34 and downpipe 20. As illustrated in FIG. 4, each of the pipes 50 interconnects between the manifold 34 and a downpipe 20 and collectively lie within a reduced height envelope defined by the height dimension of the inlet bleed heater. That is, the maximum height of the bleed heater is now the height of the heater from its bottom to the top of the manifold 34 and thus it has been reduced by the elimination of the previously discussed pipe loops. The pipes 50 include an elbow 54 for turning 90° from the horizontal to the vertical downpipes 20. Each of the bellows 52 comprises a metal bellows which accommodates relative movement between the downpipes 20 and the manifold. That is, the bellows 52 accommodate thermal longitudinal expansion and contraction of the vertical portions of tubes 20. The bellows also accommodate the thermal expansion and contraction in an axial direction of the header 34.

Figure 8:
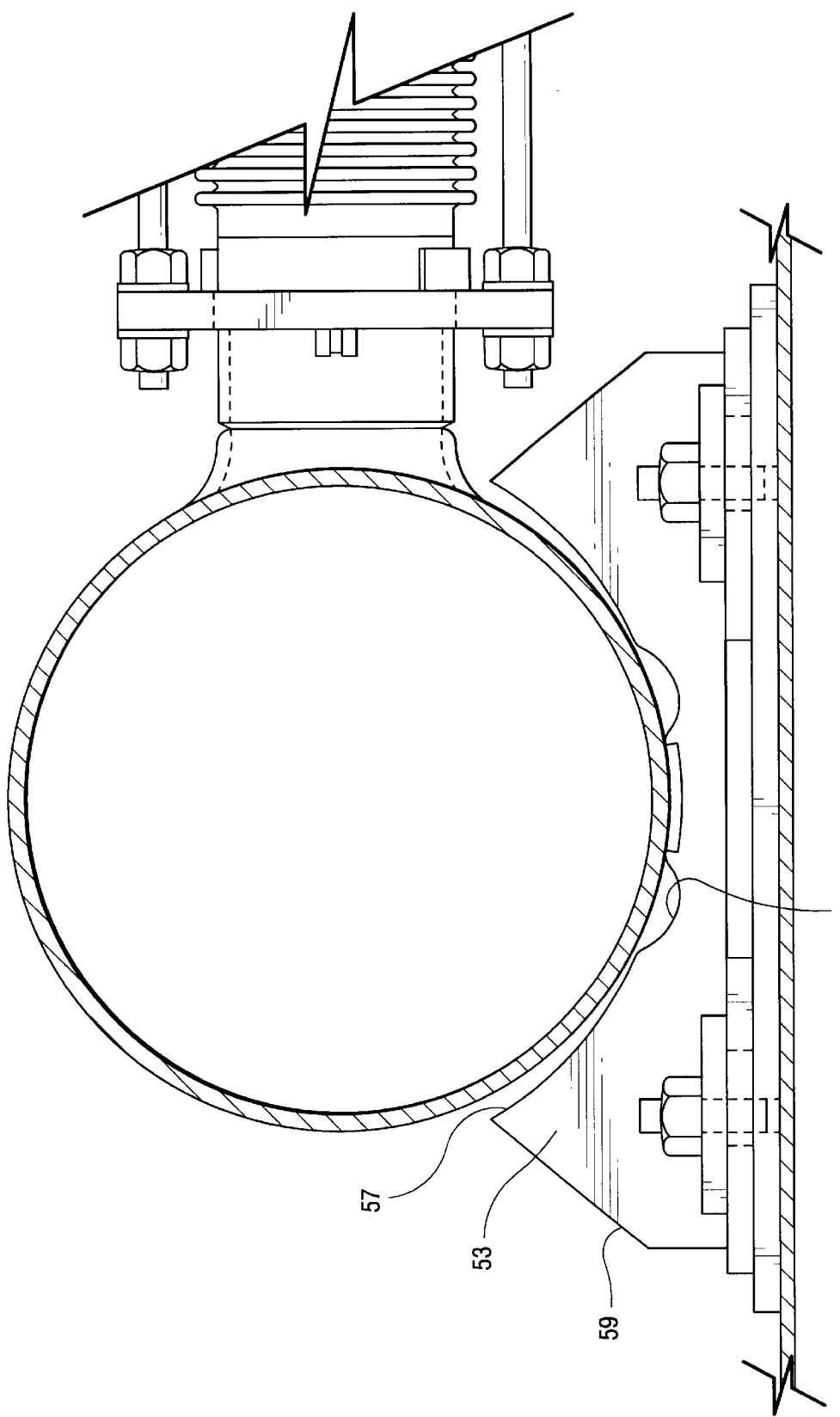
FIG. 8 is a cross-sectional view illustrating a saddle for the manifold on the roof of the inlet bleed heater.

As illustrated in FIG. 8, the header 34 is supported by thermally compliant saddles 53 for centering the manifold 34 on the duct roof, three saddles being preferred at spaced longitudinal positions along the manifold. The saddles 53 allow for thermal movement of the manifold in the direction of flow and perpendicular to the direction of flow. This is accomplished using slotted holes 55 and arcuate surfaces 57 in excess of the curvature of the manifold. Preferably, each saddle includes a pair of saddle plates 59 in spaced sideby-side relation at each of the three saddle locations. These features greatly reduce the impact of thermal stress on the manifold and thermal sleeves. These thermally compliant saddles help reduce the stresses so that X-ray inspection of the weld is not required for code compliance.

Significantly, the elimination of the pipe loops enables the inlet bleed heater to lie within a reduced envelope and particularly in the height dimension H to permit the heater to be placed on its side on a flatbed trailer without exceeding most road width limitations. Referring to FIG. 6, the length, height and width dimensions L, H and W, respectively, of the inlet bleed heater are illustrated. The reduction in the height dimension H of the bleed heater permits the heater to be rotated 90° on one side for location on the flatbed trailer 60. Preferably, the side of the heater which rests on the trailer lies closer to the manifold 34 than does the opposite side, as illustrated in FIG. 6 in order to lower the center of gravity of the unit for transportation from the factory or fabrication site to the electrical power generation site. The height dimension H is thus reduced to a value less than the standard width dimension for road travel whereby the unit does not require wide-load or special width permits. Moreover, the width dimension W of the unit extends vertical when the unit lies on its side on the flatbed trailer and lies well below bridge heights to enable the heater to pass below bridges without the danger of hitting the bridges. Additionally, it will be appreciated that substantial time and costs are eliminated by providing the unit fabricated wholly at a fabrication or factory site without the necessity for field installation of pipe loops or ancillary structure, thereby eliminating the need for field welding and field X-rays of the welds.

It will be appreciated that aspects of the disclosed embodiment of the invention may be varied. For example, the number of downpipes 20 can be reduced as illustrated in FIG. 7. The downpipes 20 can be located behind every other silencer panel 18 with acceptable temperature spread at the compressor inlet. Pipe guides 60 are illustrated in FIG. 7 for locating the downpipes 20. Even fewer downpipes have been shown to provide acceptable temperature spread.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An inlet bleed heater for a compressor comprising:
   a housing defining an air inlet duct for delivering ambient air along a flowpath to the compressor;
   a plurality of tubes in the flowpath of said air inlet duct, said tubes adapted for receiving heated extraction air from the compressor;
   each said tube including a plurality of apertures spaced from one another for discharging the heated air from the tubes into the flowpath for mixing with the ambient inlet air passing the tubes to supply heated air to the compressor; and
   a manifold carried by said housing for supplying the extraction air from the compressor to the tubes, said manifold and each of said tubes being connected to one another by a bellows enabling relative movement between the manifold and the tubes in response to thermally induced forces.

2. A system according to claim 1 including a second bellows connected between said manifold and each of said tubes.

3. A system according to claim 1 wherein said housing lies within an envelope having a predetermined height and width dimensions, said bellows lying within an envelope defined by the height dimension.

4. A system according to claim 1 including a pipe connecting each of said tubes and said manifold, said pipe in part being constituted by said bellows.

5. A system according to claim 1 including a second bellows connected between said manifold and each of said tubes, a pipe connecting each of said tubes and said manifold, said pipe in part being constituted by said first and second bellows.

6. A system according to claim 5 wherein said bellows are formed of metal.

7. A system according to claim 1 including at least one saddle carried by said housing for mounting said manifold on said housing.

8. A system according to claim 7 wherein said manifold is elongated, said saddle being thermally compliant enabling said manifold for deployment relative to the saddle in at least one of directions parallel to said elongated manifold and transverse thereto.

9. A system according to claim 7 wherein said saddle enables displacement of said manifold in both of said directions.

10. A method according to claim 9 wherein said manifold extends in a lengthwise direction generally parallel to and between opposite ends of said inlet duct and is located closer to said one side than to an opposite side of the fabricated heater, and including the step of disposing the inlet bleed heat on the trailer with said manifold closer to said one side than to an opposite side.

11. A method according to claim 7 wherein the inlet bleed heater fabricated at the fabrication site has a top and bottom defining a height dimension normal to the flow of inlet air through the duct, a length dimension generally normal to the flow of inlet air through the duct and a width dimension between opposite sides parallel to the flow of inlet air through the duct, said step of transporting the fabricated inlet bleed heater, including turning the inlet bleed heater on one of said sides and disposing the inlet bleed heater on a trailer with said one side down with the length dimension disposed parallel to a direction of travel of the trailer.

12. A method of providing an electricity generation site with an inlet bleed heater for heating ambient inlet air to a compressor, said heater including a housing defining an air inlet duct, a plurality of tubes extending into the duct, and a manifold for receiving heated air from a heat air source, comprising the steps of:
   fabricating the duct, tubes and manifold at a fabrication site;
   interconnecting the tubes and manifold one to the other at the fabrication site with a device for accommodating thermally induced movement of the manifold relative to the tubes; and
   transporting the fabricated inlet heater to the electricity-generating site.

13. A method according to claim 12 wherein each tube and manifold is interconnected by a bellows, connecting the bellows between each of the tubes and the manifold at the fabrication site.

14. A system according to claim 12 including mounting the manifold to the housing to enable thermal expansion and contraction of the manifold.

15. A system according to claim 14 wherein said manifold is elongated, and mounting said manifold to the housing to enable thermal expansion and contraction of said manifold relative to said housing in directions parallel and transverse to the direction of elongation of the manifold.

* * * * *

UNITED STATES PATENT AND TRADEMARK OFFICE
CERTIFICATE OF CORRECTION

PATENT NO.     : 6,685,425 B2
DATED          : February 3, 2004
INVENTOR(S)    : Poccia et al.

It is certified that error appears in the above-identified patent and that said Letters Patent is hereby corrected as shown below:

Column 1,
Line 33, replace "donwpipes" with -- downpipes --
Line 55, replace "require" with -- requires --
Line 55, replace "the pipe loops of" with -- the pipe loops to --

Column 2,
Line 19, replace "donwpipes" with -- downpipes --
Line 36, replace "all loads" with -- tall loads --
Line 40, replace "housing 40" with -- housing 49 --

Column 5,
Line 5, replace "weld" with welds --
Line 22, replace "vertical" with -- vertically --

Column 6,
Line 20, replace "claim 7" with -- claim 8 --
Line 44, replace "heat air source" with -- heated air source --

Signed and Sealed this

Thirteenth Day of July, 2004

JON W. DUDAS
*Acting Director of the United States Patent and Trademark Office*